(12) United States Patent
Triglavcanin et al.

(10) Patent No.: US 7,981,299 B2
(45) Date of Patent: Jul. 19, 2011

(54) THICKENER AND METHOD FOR THICKENING

(75) Inventors: Richard Triglavcanin, Dalkeith (AU); Ian Arbuthnot, Mandurah (AU)

(73) Assignee: Outotec Oyj, Espoo (FI)

( * ) Notice: Subject to any disclaimer, the term of this patent is extended or adjusted under 35 U.S.C. 154(b) by 271 days.

(21) Appl. No.: 12/446,500

(22) PCT Filed: Oct. 16, 2007

(86) PCT No.: PCT/FI2007/000248
§ 371 (c)(1),
(2), (4) Date: Apr. 21, 2009

(87) PCT Pub. No.: WO2008/053066
PCT Pub. Date: May 8, 2008

(65) Prior Publication Data
US 2010/0108618 A1    May 6, 2010

(30) Foreign Application Priority Data
Oct. 30, 2006  (FI) ...................................... 20060954

(51) Int. Cl.
*B01D 21/24* (2006.01)
*B01D 21/26* (2006.01)
(52) U.S. Cl. .......... 210/712; 210/788; 210/805; 210/97; 210/195.1; 210/207; 210/512.1; 210/519

(58) Field of Classification Search .................. 210/712, 210/788, 805, 97, 195.1, 207, 512.1, 519
See application file for complete search history.

(56) References Cited

U.S. PATENT DOCUMENTS

| | | |
|---|---|---|
| 3,532,218 A | 10/1970 | Blottnitz et al. |
| 5,147,556 A | 9/1992 | Taylor |
| 5,893,970 A | 4/1999 | Wood et al. |
| 2005/0515591 | 7/2005 | Taylor et al. |

FOREIGN PATENT DOCUMENTS
WO    0012192 A1    3/2000

*Primary Examiner* — David A Reifsnyder
(74) *Attorney, Agent, or Firm* — Chernoff, Vilhauer, McClung & Stenzel

(57) ABSTRACT

The invention relates to an apparatus and a method for thickening liquids carrying suspended particles, such as a slurry containing minerals. The thickening apparatus comprises a tank (2), a feedwell (4), which includes a chamber having an inlet for receiving feed slurry (9) and an outlet in fluid communication with the tank and means for distributing the material in the tank, at least one conduit (5) for feed slurry to deliver a feed slurry (9) into the feedwell, means for diluting the feed slurry, when at least one separate dilute liquid conduit (16, 19) is directed tangentially with respect to the feedwell (4) and at least one inflow aperture (15) is arranged tangentially with respect to the feedwell for recirculating the dilute liquid from the tank inside the feedwell in order to dilute the feed slurry.

39 Claims, 2 Drawing Sheets

THICKENER AND METHOD FOR THICKENING

This is a national stage application filed under 35 USC 371 based on International Application No. PCT/FI2007/000248 filed Oct. 16, 2007, and claims priority under 35 USC 119 of Finnish Patent Application No. 20060954 filed Oct. 30, 2006.

This invention relates in general to solid-liquid separation. More specifically, it relates to a thickening apparatus and method for thickening mineral slurries.

In a clarification or thickening process a slurry comprising liquids carrying suspended particles is introduced into the thickener or settling tank in order to separate particles from liquid. Basic components of a thickener are bridge and tank, drive, feedpipe, feedwell, rakes (including shaft and scrapers), underflow cone and overflow launder. In the tank the suspended particles form a thickened mud on the bottom of the tank. The thickened material settles to the bottom of the thickener tank and is furher removed and processed, while the liquor component rises to the upper part of the thickener to flow into the overflow launder and exits the overflow box. A rake is arranged to move the viscous solids settled on the bottom of the thickener towards an underflow cone positioned in the center of the thickener tank. Slurry enters thickener through the feedpipe and feedwell. The rate of settling is often increased using an optimized amount and type of flocculating agents. The flocculant is added into the feed in order to agglomerate the suspended particles of the slurry. The idea in flocculation is to bind solid particles together to assist the gravity based separation process.

A feedwell is often used to feed the slurry into the thickener tank through the open bottom of the feedwell and to provide means for flocculating a slurry before entering the tank. Also the thickener feedwell's function is to mix the slurry feed with flocculant and allow the flocculated solids to settle. Feedwell is typically located in the middle of the thickener tank to allow these settling solids to be evenly distributed within the thickener tank. To make the flocculation process more effective and efficient the slurry feed usually needs to be diluted with extra process liquor (water). The dilution is usually achieved in thickeners by recycling some of the dilute liquid overflow from the top of the thickener tank This invention relates in general to solid-liquid separation. More specifically, it relates to a thickening apparatus and method for thickening mineral slurries.

In a clarification or thickening process a slurry comprising liquids carrying suspended particles is introduced into the thickener or settling tank in order to separate particles from liquid. Basic components of a thickener are bridge and tank, drive, feedpipe, feedwell, rakes (including shaft and scrapers), underflow cone and overflow launder. In the tank the suspended particles form a thickened mud on the bottom of the tank. The thickened material settles to the bottom of the thickener tank and is furher removed and processed, while the liquor component rises to the upper part of the thickener to flow into the overflow launder and exits the overflow box. A rake is arranged to move the viscous solids settled on the bottom of the thickener towards an underflow cone positioned in the center of the thickener tank. Slurry enters thickener through the feedpipe and feedwell. The rate of settling is often increased using an optimized amount and type of flocculating agents. The flocculant is added into the feed in order to agglomerate the suspended particles of the slurry. The idea in flocculation is to bind solid particles together to assist the gravity based separation process.

A feedwell is often used to feed the slurry into the thickener tank through the open bottom of the feedwell and to provide means for flocculating a slurry before entering the tank. Also the thickener feedwell's function is to mix the slurry feed with flocculant and allow the flocculated solids to settle. Feedwell is typically located in the middle of the thickener tank to allow these settling solids to be evenly distributed within the thickener tank. To make the flocculation process more effective and efficient the slurry feed usually needs to be diluted with extra process liquor (water). The dilution is usually achieved in thickeners by recycling some of the dilute liquid overflow from the top of the thickener tank back to the feedwell in order to dilute the inflowing pulp. In order to recycle the overflow liquor sometimes pumps, fluid lines and valves need to be installed.

The reference U.S. Pat. No. 5,147,556 discloses a thickener for solid suspensions and pulps and in particular to recycling of overflow liquor in thickeners. According to the invention the dilute liquid in the tank is further recirculated into the feedwell through either an aperture in the feedwell wall or in the feed line when the surface level of the tank is higher than the surface level in the feedwell. The slurry feed is fed tangentially into the feedwell and the dilute liquid enters the feedwell radially for diluting the slurry. As a result some of the mixing energy is lost when the incoming feed slurry must change the direction of the dilute liquid flow to that of the feed slurry flow, so that the maximum mixing effect is not achieved. The mixing effect in the feedwell has to be effective in order to mix the feed slurry with the dilute liquid for diluting the slurry and the flocculant properly.

The objective of this invention is to provide a thickener, which provides a means for feeding a dilute liquid for diluting the slurry into the feedwell so that the mixing inside the feedwell is the most advantageous.

This above mentioned objective is achieved by an apparatus and a method described later in the independent claims. Other advantageous embodiments of the invention are presented in the dependent claims.

A thickening apparatus adapted to to liquids carrying suspended particles, such as slurry containing minerals, the thickening apparatus comprising a tank where settling of solids takes place, whereby pulp of higher relative density settles towards the bottom of the tank, and dilute liquid of lower relative density is thereby displaced towards the top of the tank, a feedwell, which includes a chamber having an inlet for receiving feed slurry and an outlet in fluid communication with the tank, and means for distributing the material in the tank, at least one conduit for feed slurry to deliver a feed slurry into the feedwell, means for feeding a dilute liquid, when at least one separate dilute liquid conduit is directed tangentially with respect to the feedwell and at least one inflow aperture is arranged tangentially with respect to the feedwell for recirculating the dilute liquid from the tank inside the feedwell in order to dilute the feed slurry. In this way the flow energy of the apparatus is in the same direction as the slurry feed and the maximised mixing and flocculation efficiency inside the feedwell is reached. What is also achieved by the apparatus of the invention, is that the dilute liquid flow adds to the mixing energy of the slurry feed flow. According to one embodiment of the invention the dilute liquid conduit is arranged essentially parallel to the feed slurry conduit According to one preferred embodiment of the present invention the dilute liquid conduit at least partly surrounds the feed slurry conduit at least at their entry point to the feedwell. According to one preferred embodiment of the present invention the dilute liquid conduit and the feed slurry conduit are arranged side by side tangentially with respect to the feedwell. This would give the maximum effect of both flows being in the same direction and maximum effect of any induced flow component. According to another embodiment of the present invention the dilute liquid conduit and the feed slurry conduit are arranged at certain intervals tangentially with respect to the feedwell. By using the apparatus of the invention the dilute liquid is fed at the same point as the undiluted slurry feed. After that the slurry feed is quickly diluted inside the feedwell and this again allows for better overall efficiency.

According to one preferred embodiment of the present invention the inlet of the dilute liquid conduit is arranged to reach the dilute liquid outside the feedwell. The outlet of the dilute liquid conduit extends inside the feedwell in order to feed the dilute liquid inside the feedwell.

According to the invention there is a plurality of inflow apertures in the feedwell wall for permitting the recirculation of the dilute liquid from the tank inside the feedwell. The inflow aperture is a conduit arranged at the wall of the feedwell or it is an opening in the wall of the feedwell. According to the method of the invention the dilute liquid is fed tangentially inside the feedwell through at least one separate dilute liquid conduit or through at least one inflow aperture arranged in the feedwell wall in order to dilute the feed slurry. The dilute liquid flows into the feedwell parallel in terms of the feed slurry flow. According to the one example of the invention the dilute liquid flows inside the feedwell so, that the flow at least partly surrounds the feed slurry flow at least at their entry point to the feedwell. According to the one example of the invention the dilute liquid flow and the feed slurry flow enter the feedwell tangentially side by side. According to the one example of the invention the dilute liquid flow and the feed slurry flow enter the feedwell tangentially at certain intervals. According to the one example of the invention that the dilute liquid and the feed slurry are mixed after feeding them into the feedwell. According to the invention the dilute liquid for diluting the slurry and the feed slurry are mixed after feeding them into the feedwell. This way the mixing of the fed material; feed slurry, dilute liquid and the flocculant is done inside the feedwell.

The invention is described in more detail referring to the following figures.

FIG. 1 which is a schematic presentation of the thickening apparatus according to the present invention.

Figure 1:
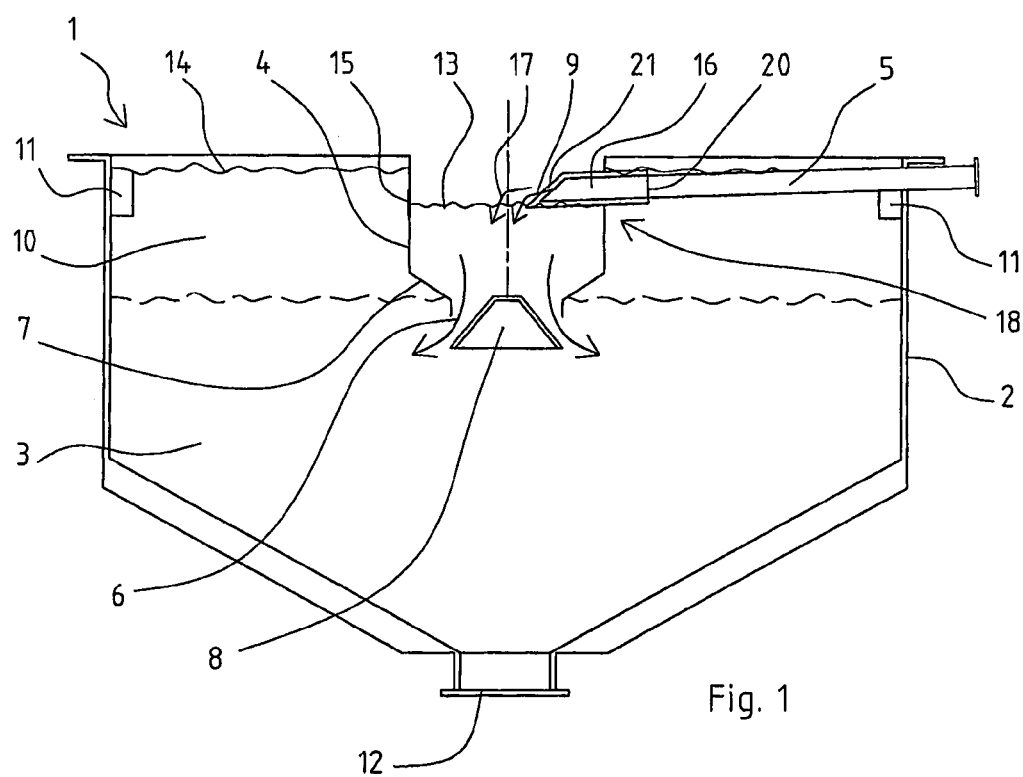

As can be seen from FIG. 1, the thickening apparatus according to one preferred embodiment of the present invention comprises a thickener 1 with a circular tank 2 for containing liquid pulp 3. A feedwell 4 is arranged in the middle of the tank and it is supplied with the feed slurry conduit 5 for feeding the slurry material 9 inside the feedwell 4, which feed slurry conduit 5 is arranged essentially tangentially with respect to the feedwell 4. According to this example, the feedwell has a restricted bottom opening 6 in fluid communication within the tank 2 through which liquid pulp in the feedwell can flow into the tank. The bottom section of the feedwell preferably comprises a downwardly conical side wall 7 so that the flow area of the liquid is smaller in the bottom section than in the above section in order to restrict the flow of liquid between the tank 2 and the feedwell 4. According to this example, below the lower section of the feedwell wall is a downwardly broadening deflector cone element 8, which is used to evenly distribute the fed material across the tank 2. Flocculating agent is mixed into the slurry, normally in the feedwell during feeding the slurry into the tank. The flocculating agent promotes the settling of the mineral slurry on the bottom of the tank and in the underflow cone. In normal operation, settling of solids takes place in the thickener tank, whereby a bed of thickened pulp 3 settles to displace an upper layer of relatively dilute liquid 10 towards the top of the tank. The thickener tank is surrounded by an overflow launder 11 which channels excess overflow liquor to a discharge pipe. The concentrated slurry is withdrawn from the underflow cone via an outlet line 12.

In this kind of configuration, the relative density of the feed slurry in the feedwell is higher than the relative density of the liquid outside the feedwell, hence the feedwell liquid level 13 is lower than the outside liquid level 14. According to the invention there are inflow apertures 15, for example conduits in the feedwell wall, through which dilute liquid from the tank recirculates' inside the feedwell in order to dilute the feed slurry in the feedwell autogenously, when the surface level is higher outside the feedwell. The inflow apertures are located above the bottom opening 6 of the feedwell and are arranged tangentially with respect to the wall of the feedwell in order to provide highly improved mixing effect in the flow. There are also means for closing the inflow apertures and means for adjusting the flow of liquid through apertures for example in the case when the pulp entering the feedwell is relatively dilute. The number of apertures needed depends on the feedwell design.

Figure 2:
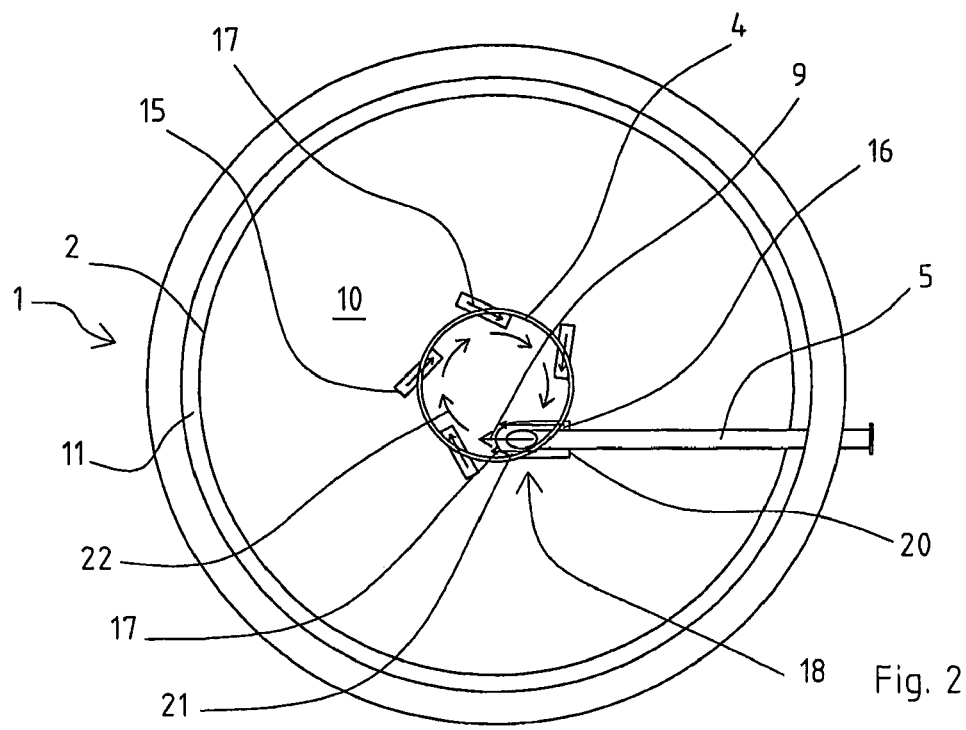
FIG. 2 is a top-view from the FIG. 1

The feed slurry conduit 5 is arranged tangentially with respect to the feedwell 4 so that the slurry fed is mixed homogenously inside the feedwell. According to the invention the dilute liquid conduit 16 for feeding dilute liquid 17 is parallel to the feed slurry conduit 5 so that also the dilute liquid 17 is fed tangentially into the feedwell 4. Dilute liquid conduit 16 is separate from slurry feed conduit 5 and the dilute liquid 17 is mixed into the slurry 9 not earlier than inside the feedwell. In the example of FIG. 1 and FIG. 2 the dilute liquid conduit 16 surrounds the feed slurry conduit 5 at least partly at their entry point 18 to the feedwell 4. The entry of the dilute liquid conduit is arranged to reach the dilute liquid in the tank surrounding the feedwell so that the dilute liquid near the surface of the thickener is permitted to enter into the dilute liquid conduit 16, through which the dilution liquid flow 17 enters into the feedwell where it dilutes the feed slurry 9. When the direction of flow of the dilute liquid 17 is the same as that of the feed liquid 9, mixing along the flow axis between the two streams would be promoted. In this orientation, the flow of the dilute liquid would be influenced both by the level difference between tank and the feedwell. The mixing effect of the material 22 inside the feedwell is highly improved. The inlet 20 of the dilute liquid conduit 16 and 19 is arranged to reach the dilute liquid 10 in the tank 2 in order to guide the dilute liquid inside the feedwell for diluting the fed slurry. Outlet 21 of the dilute liquid conduit 16 and 19 is arranged to reach inside the feedwell in order to guide the dilute liquid into the point where it meets and mixes with the feed slurry.

Figure 3:
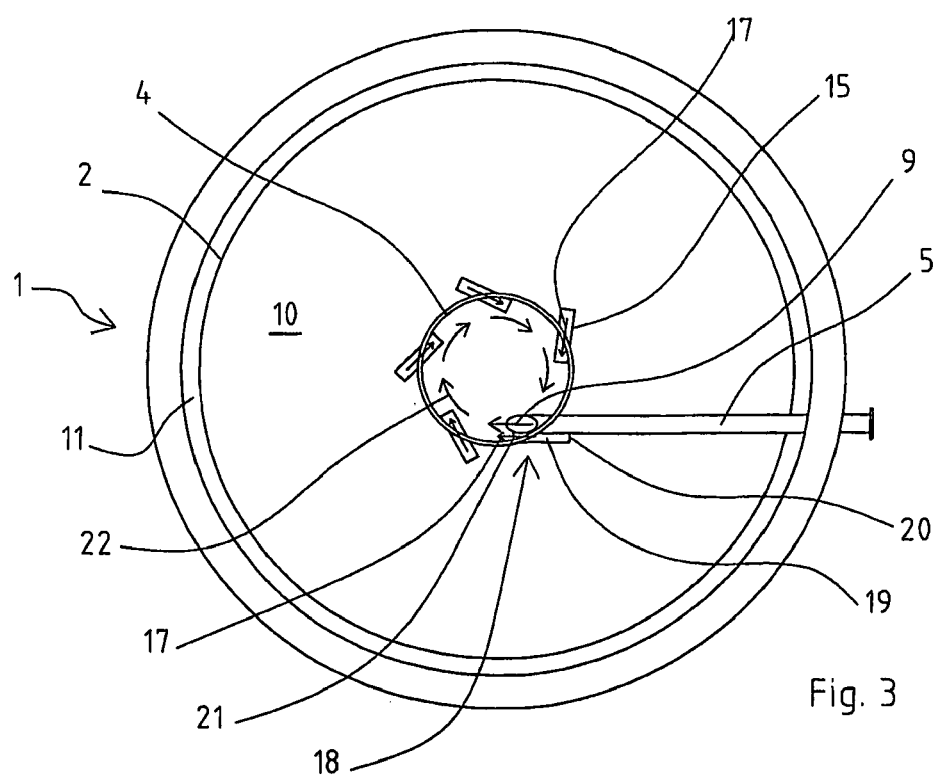
FIG. 3 is a top-view of another embodiment of the invention

In another embodiment of the invention which is described in FIG. 3, the dilute liquid conduit 19 and the feed slurry conduit 5 are arranged side by side at their entry point 18 into the feedwell. According this embodiment both the dilute liquid and the slurry are fed tangentially inside the feedwell.

While the invention has been described with reference to its preferred embodiments, it is to be understood that modifications and variations will occur to those skilled in the art. Such modifications and variations are intended to fall within the scope of the appended claims.

The invention claimed is:

1. A thickening apparatus (1) adapted to liquids carrying suspended particles, the thickening apparatus comprising:
   a tank (2) where settling of solids takes place, whereby pulp (3) of higher relative density settles towards the bottom of the tank, and dilute liquid (10) of lower relative density is thereby displaced towards the top of the tank, a feedwell (4), which includes a chamber having an inlet for receiving feed slurry (9) and an outlet in fluid communication with the tank, and means for distributing the material in the tank, at least one separate conduit (5) for feed slurry to deliver the feed slurry (9) into the feedwell, and means for diluting the feed slurry autogeneously, characterized in that at least one separate dilute liquid conduit (16, 19), which is separate from the conduit (5) for feed slurry, and at least one inflow aperture (15) are arranged separate from each other and tangentially with respect to the feedwell in a way that the dilute liquid (10) and the feed slurry (9) are flowing separately into the feedwell for recirculating the dilute liquid (10) from the tank inside the feedwell in order to dilute the feed slurry.

2. Apparatus according to claim 1, characterized in that the dilute liquid conduit (16, 19) is arranged essentially parallel to the feed slurry conduit (5).

3. Apparatus according to claim 1, characterized in that the dilute liquid conduit (16) at least partly surrounds the feed slurry conduit (5) at least at their entry point (18) to the feedwell.

4. Apparatus according to claim 1, characterized in that the dilute liquid conduit (19) and the feed slurry conduit (5) are arranged side by side tangentially with respect to the feedwell (4).

5. Apparatus according to claim 1, characterized in that the dilute liquid conduit (16, 19) and the feed slurry conduit (5) are arranged at certain intervals tangentially with respect to the feedwell.

6. Apparatus according to claim 1, characterized in that the inlet (20) of the dilute liquid conduit (16, 19) is arranged to reach the dilute liquid (10) outside the feedwell (4).

7. Apparatus according to claim 1, characterized in that the outlet (21) of the dilute liquid conduit (16, 19) extends inside the feedwell (4).

8. Apparatus according to claim 1, characterized in that there is a plurality of inflow apertures (15) in the feedwell wall for permitting the recirculation of the dilute liquid (10) from the tank inside the feedwell.

9. Apparatus according to claim 1, characterized in that the inflow aperture (15) is a conduit arranged at the wall of the feedwell (4).

10. Apparatus according to claim 1, characterized in that the inflow aperture (15) is an opening in the wall of the feedwell (4).

11. A method for thickening liquids carrying suspended particles, where the settling of solids takes place in a thickener tank (2), whereby pulp of higher relative density (3) settles towards the bottom of the tank, and dilute liquid (10) of lower relative density is thereby displaced towards the top of the tank, when the feed slurry (9) is fed through at least one separate conduit (5) tangentially into a feedwell, which includes a chamber having an inlet for receiving feed slurry and an outlet (6) in fluid communication with the tank, when the feed slurry is diluted autogenously, characterized in that at least one separate dilute liquid conduit (16, 19), which is separate from the conduit (5) for feed slurry, and at least one inflow aperture (15) are arranged separate from each other and tangentially with respect to the feedwell (4) in a way that the dilute liquid (10) and the feed slurry (9) are flowing separately into the feedwell for recirculating the dilute liquid (10) from the tank inside the feedwell in order to dilute the feed slurry.

12. A method according to claim 11, characterized in that the dilute liquid flows into the feedwell (4) parallel in terms of the feed slurry flow.

13. A method according to claim 11, characterized in that the dilute liquid flows inside the feedwell so, that the flow of the dilute liquid at least partly surrounds the feed slurry flow at least at their entry point (18) to the feedwell.

14. A method according to claim 11, characterized in that the dilute liquid flow and the feed slurry flow enter the feedwell tangentially side by side.

15. A method according to claim 11, characterized in that the dilute liquid flow and the feed slurry flow enter the feedwell tangentially at certain intervals.

16. A method according to claim 11, characterized in, that the dilute liquid (17) and the feed slurry (9) are mixed after feeding them into the feedwell (4).

17. A thickening apparatus for liquids carrying particles in suspension, the thickening apparatus including:
a tank in which settling of solids takes place, whereby pulp of higher relative density settles towards the bottom of the tank, and dilute liquid of lower relative density is thereby displaced towards the top of the tank;
a feedwell including a chamber having an inlet for receiving feed liquid and an outlet in fluid communication with the tank; and
at least one feed conduit adapted to deliver the feed liquid tangentially into the feedwell;
the feedwell and the tank being arranged such that when the relative density of the feed liquid in the feedwell is higher than the relative density of the dilute liquid in the tank outside the feedwell, the liquid level in the feedwell is lower than the liquid level in the tank;
the apparatus further including at least one inflow aperture arranged to provide recirculation of the dilute liquid from the tank tangentially into the feedwell for autogenous dilution of the feed liquid within the feedwell, when the liquid level in the tank is higher than the liquid level in the feedwell.

18. An apparatus according to claim 17, including a plurality of said inflow apertures.

19. An apparatus according to claim 18, wherein the inflow apertures are disposed in a wall of the feedwell above the outlet.

20. An apparatus according to claim 19, wherein the inflow apertures are arranged tangentially in the wall of the feedwell.

21. An apparatus according to claim 18, wherein at least one of the inflow apertures includes a dilute liquid conduit arranged to direct the dilute liquid from the tank tangentially into the feedwell.

22. An apparatus according to claim 21, wherein the dilute liquid conduit is substantially parallel to the feed conduit.

23. An apparatus according to claim 21, wherein the dilute liquid conduit at least partly surrounds the feed conduit at an entry point to the feedwell.

24. An apparatus according to claim 21, wherein the dilute liquid conduit and the feed liquid conduit are arranged in substantially side by side relationship.

25. An apparatus according to claim 21, wherein an inlet of the dilute liquid conduit is in fluid communication with the dilute liquid outside the feedwell.

26. An apparatus according to claim 21, wherein an outlet of the dilute liquid conduit extends into the feedwell.

27. An apparatus according to claim 18, wherein the inflow apertures are arranged such that the dilute liquid and the feed liquid flow separately into the feedwell and are not mixed before entering the feedwell.

28. An apparatus according to claim 17, wherein the outlet of the feedwell includes a restricted bottom opening.

29. A method for thickening liquids carrying particles in suspension, the method including the steps of:
    providing a tank in which settling of solids takes place, whereby pulp of higher relative density settles towards the bottom of the tank, and dilute liquid of lower relative density is thereby displaced towards the top of the tank;
    delivering a feed liquid through at least one feed conduit tangentially into a feedwell including a chamber having an inlet for receiving the feed liquid and an outlet in fluid communication with the tank;
    arranging the feedwell and the tank such that in use, when the relative density of the feed liquid in the feedwell is higher than the relative density of the dilute liquid in the tank outside the feedwell, the liquid level in the feedwell is lower than the liquid level in the tank;
    arranging at least one inflow aperture to provide recirculation of the dilute liquid from the tank tangentially into the feedwell; and
    thereby diluting the feed liquid autogenously within the feedwell, when the liquid level in the tank is higher than the liquid level in the feedwell.

30. A method according to claim 29, wherein a plurality of said inflow apertures are arranged to provide recirculation of the dilute liquid from the tank tangentially into the feedwell.

31. A method according to claim 30, including the step of forming the inflow apertures in a wall of the feedwell above the outlet.

32. A method according to claim 31, including the step of arranging the inflow apertures tangentially in the wall of the feedwell.

33. A method according to claim 30, wherein at least one of the inflow apertures is formed as a dilute liquid conduit and wherein the method includes the step of recirculating the dilute liquid from the tank into the feedwell through the dilute liquid conduit.

34. A method according to claim 33, including the step of arranging the dilute liquid conduit such that the dilute liquid flows from the dilute liquid conduit into the feedwell in substantially the same direction as the feed liquid.

35. A method according to claim 33, including the step of arranging the dilute liquid conduit so as to at least partly surround the feed conduit at an entry point to the feedwell.

36. A method according to claim 33, including the step of arranging the dilute liquid conduit and the feed conduit in a substantially side by side relationship.

37. A method according to claim 29, further including the step of feeding the dilute liquid and the feed liquid separately into the feedwell, such that the dilute liquid and the feed liquid are not mixed before entering the feedwell.

38. A method according to claim 29, including the step of arranging the inflow apertures such that the direction of flow of the dilute liquid entering the feedwell tangentially is substantially the same as the direction of flow of the feed liquid within the feedwell.

39. A method according to claim 29, including the step of forming a restricted bottom opening in the outlet of the feedwell.

\* \* \* \* \*